United States Patent
Smedley

(10) Patent No.: US 10,400,933 B2
(45) Date of Patent: Sep. 3, 2019

(54) PIPE CONNECTION

(71) Applicant: Severn Trent Water Limited, Coventry (GB)

(72) Inventor: Clive Smedley, Derbyshire (GB)

(73) Assignee: Severn Trent Water Limited (GB)

( * ) Notice: Subject to any disclaimer, the term of this patent is extended or adjusted under 35 U.S.C. 154(b) by 782 days.

(21) Appl. No.: 14/892,957

(22) PCT Filed: May 22, 2014

(86) PCT No.: PCT/GB2014/051585
§ 371 (c)(1),
(2) Date: Nov. 20, 2015

(87) PCT Pub. No.: WO2014/188207
PCT Pub. Date: Nov. 27, 2014

(65) Prior Publication Data
US 2016/0109049 A1 Apr. 21, 2016

(30) Foreign Application Priority Data

May 23, 2013 (GB) .................................. 1309330.7

(51) Int. Cl.
*F16L 55/175* (2006.01)
*F16L 41/08* (2006.01)

(52) U.S. Cl.
CPC ........... *F16L 55/175* (2013.01); *F16L 41/082* (2013.01)

(58) Field of Classification Search
CPC .................................................... F16L 55/175
See application file for complete search history.

(56) References Cited

U.S. PATENT DOCUMENTS

| 2,573,366 A | 10/1951 | Scholl |
| 3,367,358 A * | 2/1968 | Rentschler ............. F16L 41/12 137/375 |
| 5,022,685 A | 6/1991 | Stiskin et al. |
| 7,628,428 B2 * | 12/2009 | Rampton ................ F16L 58/02 285/45 |

(Continued)

FOREIGN PATENT DOCUMENTS

| BE | 423628 A | 10/1937 |
| CH | 183286 A | 3/1936 |

(Continued)

OTHER PUBLICATIONS

Temporary/permanent pipe repair—Guidelines AEA Technology Consulting © Crown copyright 2001, 71 pages. http://www.hse.gov.uk/research/otopdf/2001/oto01038.pdf (including relevant extract).

*Primary Examiner* — Jeffry H Aftergut
(74) *Attorney, Agent, or Firm* — St. Onge Steward Johnston & Reens LLC

(57) ABSTRACT

A device and method for permanent sealing of a connection between a larger diameter water pipe and a smaller diameter water pipe provided by a valved fitting. The device includes a first member and a second member for securing the first member to the larger diameter pipe. The first member defines a chamber for receiving the valved fitting and has a profile for engagement with the external surface of the larger diameter pipe surrounding the valved fitting and an inlet to the chamber for introducing a settable sealing material.

22 Claims, 2 Drawing Sheets

(56) References Cited

U.S. PATENT DOCUMENTS

2008/0092972 A1     4/2008   Boulet D'Auria et al.
2009/0065070 A1     3/2009   Jaehyun et al.

FOREIGN PATENT DOCUMENTS

| CN | 2248819 Y | 3/1997 |
|---|---|---|
| CN | 1946963 A | 4/2007 |
| CN | 102374353 A | 3/2012 |
| DE | 945727 C | 7/1956 |
| FR | 1296042 A | 6/1962 |
| FR | 2407420 A1 | 5/1979 |
| JP | 2001214473 A | 8/2001 |
| KR | 20120029563 A | 3/2012 |
| WO | 2014032911 A1 | 3/2014 |

\* cited by examiner

PIPE CONNECTION

FIELD OF THE INVENTION

This invention relates to pipe connections for water distribution systems, and in particular to connections between mains water pipes and service pipes for supplying individual premises.

BACKGROUND OF THE INVENTION

A utility company supplies potable water from a water treatment plant through a distribution system of underground mains pipes of reducing diameter and finally through a relatively small service pipe to individual premises.

The connection between the service pipe and the mains pipe is usually through a fitting known as a ferrule. This is a fitting which is screwed into an aperture in the mains pipe and is then connected to the service pipe. The ferrule includes a shut-off valve, so that it can be installed into the mains pipe, and the service pipe connected, without shutting off the flow through the mains pipe. The shut-off valve isolates the service pipe from the mains pipe, and so enables work to be carried out on the service pipe without shutting off the flow through the mains pipe. A utility company will try to avoid shutting off flow through a mains pipe, because of disruption to customers. It is also costly, as a shut off requires a considerable amount of time to organise and implement, and may involve the need to test the water quality before flow is restored.

The shut-off valve may fail to operate when needed, usually due to corrosion. It is also possible for a leak to occur at the connection of the ferrule to the mains pipe. Either of these will require the flow to the mains pipe to be shut off, either to enable the ferrule to be replaced, or the leak to be sealed.

SUMMARY OF THE INVENTION

According to a first aspect of the present invention, we provide a device for permanent sealing of a connection between a larger diameter water pipe and a smaller diameter water pipe provided by a valved fitting, the device comprising a first member defining a chamber for receiving the valved fitting and having a profile for engagement with the external surface of the larger diameter pipe surrounding the valved fitting and an inlet to the chamber for introducing a settable sealing material, and a second member for securing the first member to the larger diameter pipe.

The device can be used for permanent sealing of a valved fitting such as a ferrule without needing to shut off the flow through the larger diameter pipe. A replacement ferrule (if required) can then be installed adjacent to the old one, also without shutting off flow. The device can be used where the shut-off valve in the fitting is inoperable, or there is a leak at the connection of the fitting to the larger diameter pipe, as the settable sealing material encases the fitting itself and surrounds the connection between the fitting and the larger diameter pipe.

In use, the smaller diameter pipe can be removed from the fitting and the outlet stopped. The first member is placed onto the larger diameter pipe over the fitting, with the profile in engagement with the external surface of the larger diameter pipe, so that the fitting is within the chamber. The first member is then secured in place on the larger diameter pipe by the second member. The settable sealing material is then introduced into the chamber to encase the fitting and seal the connection between the fitting and the larger diameter pipe.

Conveniently, the first member comprises a curved base with an aperture to surround the fitting, to which is connected a hollow member forming the substantial part of the chamber. It will be appreciated that the first member and the hollow member may be constructed as a single piece. The hollow member has an opening surrounding the aperture in the base, and an inlet through which the settable sealing material is introduced. The hollow member is preferably substantially a cuboid, with the opening in a lower side and the inlet in an upper side opposite the lower side. In alternative embodiments, the hollow member may have any other appropriate shape. Conveniently a pair of flanges projects from the curved base. The flanges may have openings assisting in securing the first member to the larger diameter pipe. The hollow member may also have a second inlet through which fluid can be introduced for leak-testing. Preferably, the second inlet is located in a side wall of the hollow member.

The second member may comprise a curved portion engaging with the larger diameter pipe. It may also have a pair of projecting flanges. The flanges correspond to those on the first member, and have corresponding openings. Fastening means such as bolts may be used to secure the first and second members together round the larger diameter pipe, and thus secure the first member to the pipe. The fastening means may be straps, instead of or in addition to the bolts or other fastening means. Irrespective of the fastening means used, the skilled person will appreciate that the first member must be secured to the pipe sufficiently tightly to allow the engagement between the first member and the pipe to be leak-tight.

Conveniently, the second member does not need to have a leak-tight engagement with the pipe, as its main purpose is to secure the first member to the pipe.

In an alternative arrangement, the second member may therefore comprise one or more straps securing the first member to the larger diameter pipe. Advantageously, embodiments in which the second member comprises straps may reduce the amount of space required below the larger diameter pipe during fitting of the device.

The settable sealing material may be of any suitable composition, such as a cement or concrete approved for use in the water supply.

Similarly, the first and second members will be of materials approved for use in the water supply. The first and second members may be of high tensile steel, coated with a paint to prevent corrosion. The fastening means may be of stainless steel.

According to a second aspect of the invention, we provide a method for permanent sealing of a connection between a larger diameter water pipe and a smaller diameter water pipe provided by a valved fitting, using a device according to the first aspect of the invention, the method comprising:
  removing the smaller diameter water pipe from an outlet of the fitting and stopping flow through the outlet;
  placing the first member over the fitting such that the profile engages the larger diameter pipe and the fitting is received in the chamber;
  using the second member to secure the first member to the larger diameter pipe; and
  introducing the settable sealing material into the chamber to encase the fitting and seal the connection between the fitting and the larger diameter pipe.

The method provides a simple way of sealing the fitting and the connection between the fitting and the larger diameter pipe without needing to shut off the flow through the larger diameter pipe.

The method may also include a step of pressure testing the connection between the first member and the larger diameter pipe, before introduction of the settable sealing material.

BRIEF DESCRIPTION OF THE DRAWINGS

An embodiment of the invention is illustrated, by way of example only, in the accompanying drawings, in which.

DETAILED DESCRIPTION OF THE INVENTION

Figure 1:
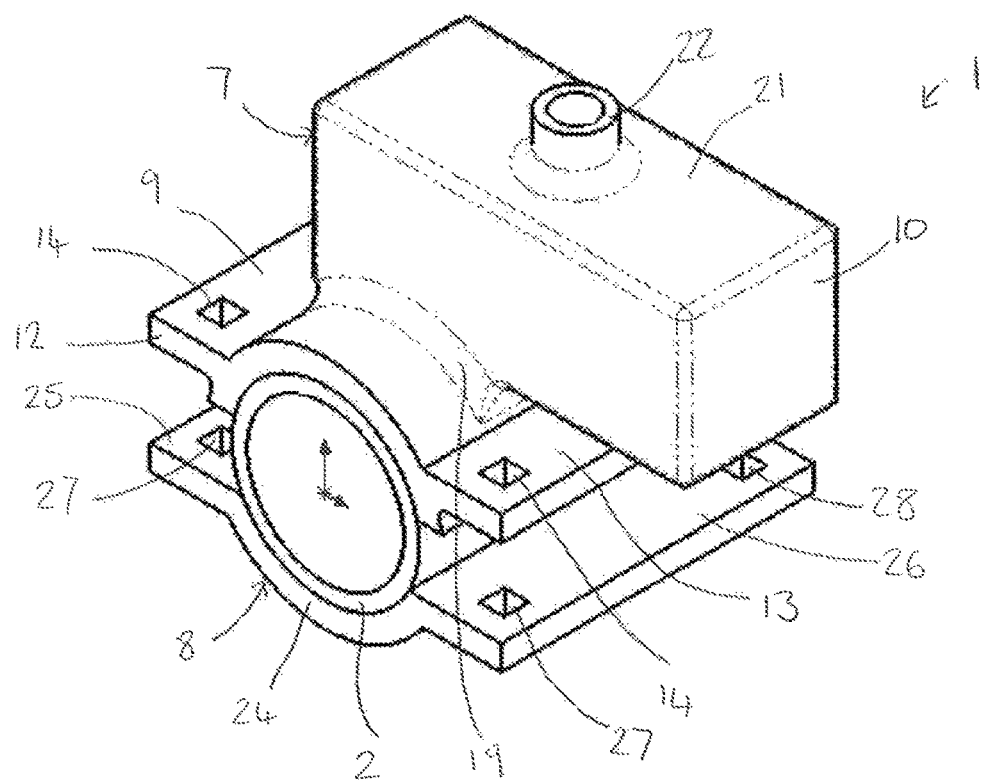
FIG. 1 is a perspective view of a device according to the first aspect of the invention.
Figure 2:
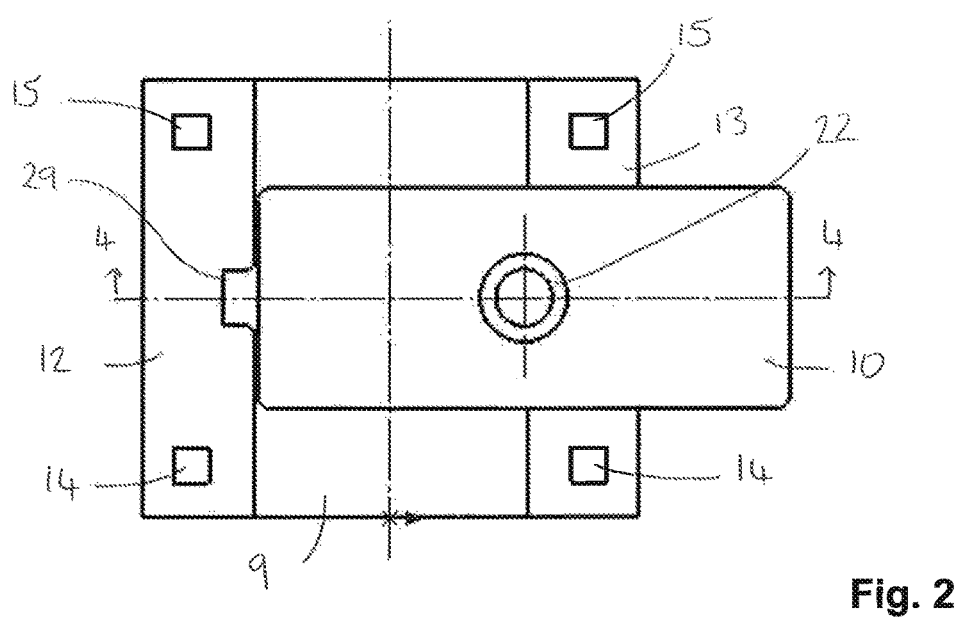
FIG. 2 is a top view of the device of FIG. 1.
Figure 3:
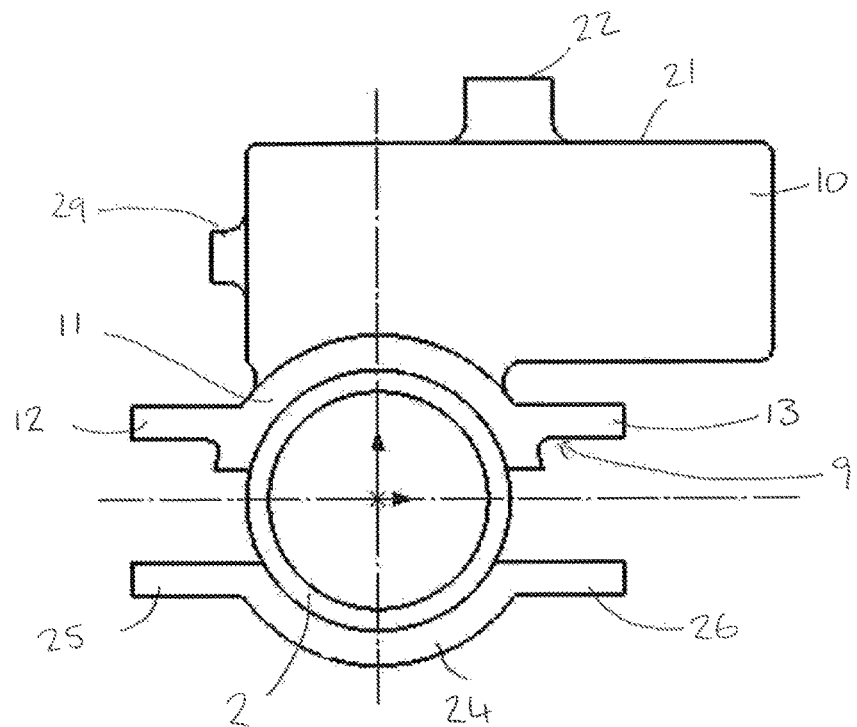
FIG. 3 is a side view of the device of FIG. 1.
Figure 4:
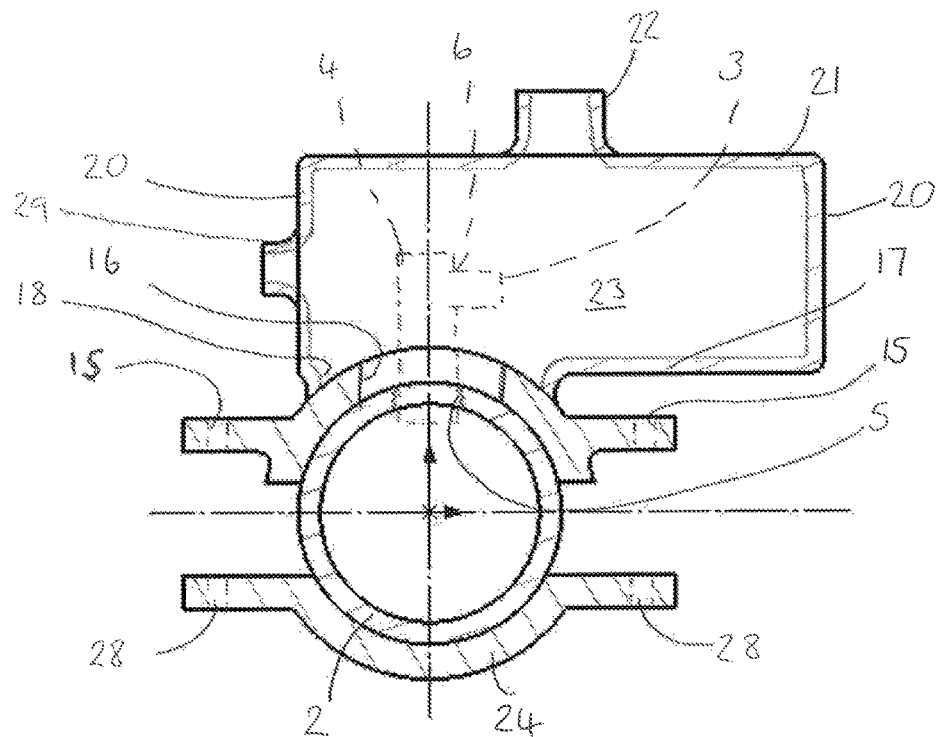
FIG. 4 is a section along the line 4-4 of FIG. 2.

The device 1 shown in the drawings is designed to provide a permanent seal of a connection between a larger diameter water pipe 2 (a mains pipe) and a smaller diameter water pipe 3 (a service pipe), using a valved fitting 4 (the pipe 3 and fitting 4 are shown schematically in outline in FIG. 4). The valved fitting 4 is a ferrule, screwed into an aperture 5 in the mains pipe 2, and to an outlet 6 of which the service pipe 3 is connected. The ferrule includes a valve (not shown) for shutting off water flow through the ferrule to the service pipe 3.

The device 1 comprises a first member 7 and a second member 8. The first member 7 comprises a base part 9, on which is mounted a hollow member 10.

The base part 9 has a curved portion 11 whose profile is designed to correspond to the external profile of the mains pipe 2, and a pair of flanges 12, 13 projecting on opposed sides of the curved portion 11. Each flange 12, 13 has two openings 14, 15, one adjacent each axial end of the flange 12, 13. The curved portion 11 has a central aperture 16 (see FIG. 4) enabling the base part 9 to fit over the fitting 4 with the curved portion 11 in engagement with the mains pipe 2.

The hollow member 10 is substantially a cuboid, being connected to the base part 9 at a lower wall 17. The lower wall 17 has an opening 18 with a profile 19 to correspond to the profile of the curved portion 11, to which it is connected. The opening 18 is larger than the central aperture 16. The height of the side walls 20 of the hollow member 10 are chosen so that the fitting 4 is completely received within the hollow member 10. The upper wall 21 of the hollow member 10 has an inlet 22. The axial length of the hollow member 10 is chosen so that it is less then the distance between the openings 14, 15 in the flanges 12, 13. The dimension of the hollow member 10 perpendicular to the axial direction is approximately the same as that of the base part 9, but it is offset to one side, although the inlet 22 is placed centrally on the upper wall 21.

There is a further inlet 29 in one of the side walls 20. Each inlet 22, 29 can be sealed by a removable stopper (not shown).

The first member 7 is of high tensile steel, with the base part and the hollow member 10 welded together. The welded component is then coated with a paint to prevent corrosion. The first member 7 is designed to accommodate a settable sealing material in a chamber 23 defined by the hollow member 10 and the central aperture 16.

The second member 8 is also of high tensile steel coated with paint. It comprises a curved portion 24 whose profile corresponds to the external profile of the mains pipe 2, and a pair of flanges 25, 26, one projecting from each axial side of the curved portion 24. Each flange 25, 26 has two openings 27, 28, one adjacent each axial end of the flange 25, 26. The flanges 25, 26 and the openings 27, 28 correspond to the flanges 12, 13 and openings 14, 15 of the first member 7. The second member 8 is used to secure the first member 7 to the mains pipe 2 by means of nuts and bolts (not shown) passing through the openings 14, 27 and 15, 28 respectively. The nuts and bolts are of high tensile stainless steel.

The device 1 is used in a situation where the service pipe 3 needs repair or renewal, and the valve of the fitting 4 cannot close off the flow to the service pipe 3. This may happen if the valve or the fitting is corroded, or is otherwise inoperable. The device 1 may also be used where there is a leak at the aperture 5 in the mains pipe 2. The device 1 permanently seals the connection between the pipes 2, 3 provided by the fitting 4, and the connection between the pipe 2 and the fitting 4, without needing to shut off flow through the mains pipe 2.

When one of the above situations is detected, the service pipe 3 is disconnected from the outlet 6 of the fitting 4 and the outlet 6 stopped off in any suitable manner. The first member 7 is then placed on the mains pipe 2 with the central aperture 16 over the fitting 4 so that the curved portion 11 engages the pipe 2. The portion of the fitting 4 projecting from the pipe 2 is completely received in the chamber 23. The second member 8 is then placed round the pipe 2 opposite the first member 7, and the openings 14, 27 and 15, 28 aligned. The bolts are passed through the aligned openings and fastened by nuts, tightened such that the first member 7 is securely attached to the pipe 2. The seal between the first member 7 and the pipe 2 is then pressure tested. With the inlet 22 sealed by a stopper, water is pumped into the member 10 through the inlet 29. If the water does not leak out at the axial edges of the first member 7, the device 1 is correctly installed. The stopper is then removed from the inlet 22 and the inlet 29 sealed by a stopper. Settable sealing material (not shown), such as a cement or concrete mix approved for use in water supply, is then poured into the chamber 23 through the inlet 22. The material fills the central aperture 16 and then the remainder of the chamber 23 in the hollow member 10. The fitting 4 is encased, so that the stopped outlet 6 is sealed, as is the fitting 4 at the aperture 5. Once the sealing material is set the fitting 4 is sealed permanently. It will be appreciated that this operation can be completed without shutting off flow through the mains pipe 2. If required, a new fitting 4 can be installed in the mains pipe 2 adjacent the device 1.

It will be appreciated by the skilled person that various modifications can be made to the device described. Several alternative or additional embodiments are described below, but are not illustrated.

The second member 8 can be modified, and in some embodiments, may for example comprise a pair of straps (not shown) extending round the pipe 2 and fastened to the flanges 12, 13 to secure the first member 7 to the pipe 2. Instead of nuts and bolts, straps (not shown) may be used to secure the first and second members together.

The aperture 16 is positioned so as to allow the valved fitting to pass through into the hollow member 10. It will therefore be appreciated that the aperture 16 may be offset from a central position. The offset may be longitudinal (i.e. in use, along the length of the pipe) or circumferential, or a combination of the two. In embodiments in which the aperture 16 is not central, more fastening points may be required, or the fastening points may be positioned differently.

It will be appreciated that the hollow member 10 may be rounded, or may have any other appropriate shape. In embodiments in which the hollow member 10 is rounded, there may not be a clear distinction between the side walls 20, lower wall 17 and/or upper wall 21 of the hollow member 10. The skilled person will understand that, in such embodiments, side, lower and upper wall regions (20, 17, 21) as defined by the orientation of the hollow member 10 in use, fulfil the equivalent functions.

In some embodiments, the hollow member 10 may be aligned so that its longest dimension is parallel to the pipe instead of perpendicular to it, or at any angle between the parallel or perpendicular configurations. In embodiments with more than two openings 14, 15 in the flanges 12, 13, the axial length of the hollow member 10 is chosen so that it is less then the distance between the outermost openings 14, 15 in the flanges 12, 13, in a longitudinal direction.

The inlets 22, 29 may be located in any suitable place on the hollow member 10. For example, inlet 22 may be offset from a central position, or may be located on a side wall 20 of the hollow member 10.

The invention claimed is:

1. A method for permanent sealing of a connection between a larger diameter water pipe and a smaller diameter water pipe provided by a valved fitting, the method comprising:
    providing a device having a first member defining a chamber for receiving the valved fitting and having a profile for engagement with an external surface of the larger diameter pipe surrounding the valved fitting and an inlet to the chamber for introducing a settable sealing material, and a second member for securing the first member to the larger diameter pipe;
    removing the smaller diameter water pipe from an outlet of the valved fitting;
    stopping flow through the outlet;
    placing the first member over the valved fitting such that the profile engages the larger diameter pipe and the valved fitting is received in the chamber;
    using the second member to secure the first member to the larger diameter pipe; and
    introducing the settable sealing material into the chamber to encase the valved fitting and seal the connection between the valved fitting and the larger diameter pipe.

2. The method of claim 1, further comprising pressure testing the connection between the first member and the larger diameter pipe, before introduction of the settable sealing material, wherein:
    the device includes a hollow member connected to the first member and a further inlet is provided on a side wall of the hollow member; and
    pressure testing the connection between the first member and the larger diameter pipe comprises sealing the inlet, pumping fluid into the hollow member through the further inlet and checking whether the fluid leaks out at axial edges of the first member.

3. The method of claim 1, further comprising installing a new valved fitting in the larger diameter pipe adjacent the device.

4. A system including: a first water pipe; a second water pipe having a smaller diameter than the first water pipe; a connection between the first and second pipes formed by a valved fitting; and a device arranged to permanently seal the connection between the first and second pipes, wherein the device comprises: a first member defining a chamber configured to receive the valved fitting and having a profile for engagement with the external surface of the first pipe surrounding the valved fitting, and an inlet to the chamber for introducing a settable sealing material; and a second member for securing the first member to the first pipe, wherein the system further includes a settable sealing material in the chamber of the device.

5. A system as in claim 4, in which the first member comprises a curved base with an aperture to surround the valved fitting.

6. A system as in claim 5, in which a hollow member is connected to the curved base, the hollow member forming a substantial part of the chamber.

7. A system as in claim 6, in which the first member and the hollow member are constructed as a single piece.

8. A system as in claim 6, in which the hollow member has an opening surrounding the aperture in the curved base, and an inlet through which the settable sealing material is introduced.

9. A system as in claim 6, in which the hollow member is substantially a cuboid.

10. A system as in claim 8, in which the hollow member has the opening in a lower side and the inlet in an upper side opposite the lower side.

11. A system as in claim 6, in which the hollow member has a further inlet provided on a side wall of the hollow member.

12. A system as in claim 5, in which a pair of flanges projects from the curved base.

13. A system as in claim 12, in which the flanges have openings which, in use, assist in securing the first member to the larger diameter pipe.

14. A system as in claim 12, in which the second member comprises a curved portion arranged to engage with the larger diameter pipe, and a pair of projecting flanges.

15. A system as in claim 14, in which the flanges of the second member correspond to the flanges on the first member, and have corresponding openings.

16. The system of claim 4, in which the second member comprises one or more straps.

17. A system as in claim 4, in which fastening means are used to secure the first member and the second member together around the larger diameter pipe, and thus secure the first member to the larger diameter pipe.

18. A system as in claim 17, in which the fastening means are bolts, and/or straps.

19. A system as in claim 4, in which the settable sealing material is a cement or concrete.

20. A system as in claim 4, in which the first and second members are made of high tensile steel, and the fastening means are made of stainless steel.

21. A system as in claim 4, in which the first and second members are coated with a paint to prevent corrosion.

22. A system as in claim 4, wherein the chamber is arranged to encase the valved fitting and a cut-off portion of the smaller diameter water pipe to permanently close the connection between the larger diameter water pipe and the smaller diameter water pipe.

* * * * *